(12) United States Patent
Hoffman et al.

(10) Patent No.: US 7,819,958 B2
(45) Date of Patent: Oct. 26, 2010

(54) PURGE VALVE

(75) Inventors: Fred W. Hoffman, Columbia Station, OH (US); Leonard A. Quinn, Lagrange, OH (US); Randall W. Nichols, Westlake, OH (US)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 1419 days.

(21) Appl. No.: 11/200,337

(22) Filed: Aug. 8, 2005

(65) Prior Publication Data

US 2007/0028777 A1 Feb. 8, 2007

(51) Int. Cl.
*B01D 53/02* (2006.01)

(52) U.S. Cl. .............................. 96/143; 96/108; 96/109; 96/136; 96/116; 55/385.1; 55/313; 55/490; 55/502; 95/52; 95/273

(58) Field of Classification Search ............... 55/DIG. 5, 55/385.1, 313, 314, 315, 490, 504, 505, 502; 96/116, 109, 108, 136, 142–147; 137/102, 137/117, 118; 251/129, 63.5, 63.6, 356, 251/368; 29/24.5, 426, 428; 303/DIG. 12, 303/84.2; 95/52, 273

See application file for complete search history.

(56) References Cited

U.S. PATENT DOCUMENTS

| | | | |
|---|---|---|---|
| 2,419,192 A | 4/1947 | Anderson | |
| 2,893,799 A | 7/1959 | Marien | |
| 3,115,934 A * | 12/1963 | Rector | 166/97.5 |
| 3,389,973 A | 6/1968 | Fitzpatrick | |
| 3,462,333 A | 8/1969 | McCormick et al. | |
| 3,503,823 A | 3/1970 | Richart et al. | |
| 3,554,563 A | 1/1971 | Schumacher et al. | |
| 3,656,414 A | 4/1972 | Muller | |
| 3,658,350 A | 4/1972 | Ondraka | |
| 3,751,047 A | 8/1973 | McGee | |
| 3,765,560 A | 10/1973 | Kemp | |
| 3,855,073 A | 12/1974 | Kucharzyk | |
| 4,052,112 A | 10/1977 | Faber | |
| 4,132,420 A | 1/1979 | Lundholm | |
| 4,206,930 A | 6/1980 | Thrane et al. | |
| 4,244,192 A | 1/1981 | Chellis | |
| 4,552,233 A | 11/1985 | Klima | |
| 4,576,381 A | 3/1986 | Slack | |
| 4,629,200 A | 12/1986 | Ruddy | |

(Continued)

OTHER PUBLICATIONS

Bendix Flyer, Installation Instructions, S-1523, dated Jan. 2010.

(Continued)

*Primary Examiner*—Jason M Greene
*Assistant Examiner*—Karla Hawkins
(74) *Attorney, Agent, or Firm*—Calfee, Halter & Griswold LLP

(57) ABSTRACT

A purge valve for use with an air drying system is provided. The valve includes a housing or body, a piston disposed within the body, and a valve in communication with the piston. The respective geometries of the piston body and the valve define a circumferential cavity between and around the piston body and the valve. A sealing means is disposed within the circumferential cavity for forming a seal between the valve and the body. A plurality of guide members attached to or formed integrally with the valve provide positional stability to the valve within the body and provide enhanced airflow in, through, and around the valve.

18 Claims, 4 Drawing Sheets

U.S. PATENT DOCUMENTS

| | | | |
|---|---|---|---|
| 4,714,483 A | 12/1987 | Koening et al. | |
| 4,764,189 A | 8/1988 | Yanagawa et al. | |
| 4,955,994 A | 9/1990 | Knight et al. | |
| 5,003,940 A | 4/1991 | Hixson | |
| 5,080,133 A | 1/1992 | Johnson et al. | |
| 5,198,053 A | 3/1993 | Duncan | |
| 5,252,034 A | 10/1993 | Sweet | |
| 5,334,230 A * | 8/1994 | Sloka | 96/113 |
| 5,348,040 A * | 9/1994 | Shellhause | 137/115.04 |
| 5,427,609 A | 6/1995 | Zoglman et al. | |
| 5,509,670 A | 4/1996 | Wheeler | |
| 5,743,707 A | 4/1998 | Battig et al. | |
| 5,749,391 A * | 5/1998 | Loutzenhiser | 137/204 |
| 6,113,367 A | 9/2000 | Dunaevsky et al. | |
| 6,205,908 B1 | 3/2001 | Kumai et al. | |
| 6,319,296 B1 * | 11/2001 | Fornof | 55/313 |
| 6,361,830 B1 | 3/2002 | Schenk et al. | |
| 6,428,014 B2 | 8/2002 | Scarlett | |
| 6,485,027 B1 | 11/2002 | Carrie et al. | |
| 6,502,826 B1 | 1/2003 | Schroeder et al. | |
| 6,668,703 B2 | 12/2003 | Gamble | |
| 6,726,220 B2 | 4/2004 | Grimanis et al. | |
| 6,729,696 B2 * | 5/2004 | Kemer et al. | 303/7 |
| 7,140,291 B2 | 11/2006 | Dunaevsky et al. | |
| 2004/0119242 A1 | 6/2004 | Katumaru et al. | |
| 2007/0028777 A1 | 2/2007 | Hoffman et al. | |

OTHER PUBLICATIONS

Bendix Service Data SD-08-2414, Bendix AD-IP, Integral Purge Air Dryer, BW1811, dated May 2007.

Bendix Flyer, Installation Instructions, S-1476, dated Mar. 2006.

Bendix Flyer, Installation Instructions, S-1386, dated Mar. 2005.

System Seals, Sealing System Products, Rod Seals and Wipers, Guide Elements & Static Seals, printed from website http://SystemSeals.com/products.htm#wipers on Apr. 30, 2010, dated 2005.

Article "Sealing and guiding elements for compressors Oil-free—The environment challenge to industry" from website www.elringklinger-kunststoff.de, dated Feb. 2003.

Article Elring PTFE Properties and applications of an exceptional material from website www.elringklinger-kunstsoff.de, dated on or before Jan. 28, 2005.

Article Elring Spring Energised Seals Compact—univeral—predictable from website www.elringklinger-kunstsoff.de, dated Feb. 2003.

Article Compound Know-how Lead to Innovative Solutions from website www.elringklinger-kunstsoff.de, dated Jun. 2001.

Article "Piston and Rod Seals Spring-energized Seal Details" from website www.elringklinger-kunstsoff.de, dated on or before Jan. 28, 2005.

Article "Spring-energized Seal Types" from website www.elringklinger-kunstsoff.de, dated on or before Jan. 28, 2005.

Office Action in U.S. Appl. No. 11/045,238, mailed Mar. 8, 2006.

U.S. Appl. No. 11/045,238, submitted Jun. 8, 2006.

Examiner's Search Strategy in U.S. Appl. No. 11/045,238, dated Jun. 26, 2006.

Notice of Allowance in U.S. Appl. No. 11/045,238, including an Examiner's Amendment, mailed Jun. 12, 2006.

* cited by examiner

PURGE VALVE

TECHNICAL FIELD OF THE INVENTION

This invention relates in general to valves for use in vehicle brake systems, and in particular to a purge valve for use with air dryer systems used with commercial vehicles.

BACKGROUND OF THE INVENTION

Many heavy vehicles such as trucks and buses include air brake systems which utilize compressed air. Compressed air brake systems typically include a compressor that draws in atmospheric air and compresses it for use by the brake system components. Air that is drawn into the compressor usually includes water vapor and other contaminants. These contaminants should be removed from the compressed air before the compressed air enters the brake system to prevent freezing or other negative consequences. Removal of solid, liquid, and vapor air system contaminants can be accomplished by installing an air dryer system. Air dryers typically utilize a filter and a desiccant to collect and remove water and other air system contaminants before they enter the brake system, thereby providing clean, dry air to the system components that utilize compressed air.

Moisture that is removed from compressed air by an air dyer system is typically expelled from the air dryer itself by a valve referred to as a purge valve. The purge valve is usually located at the bottom of the air dryer base and remains open during compressor unload cycle. The purge valve allows collected moisture, condensation, and contamination to be expelled from the air dryer during a purge cycle. Thus, the purge valve is an important component of an air dryer system. However, due to the nature of their construction, which usually involves an expensive rubber to metal bonding step, purge valves typically represent a significant portion (e.g., 15-25%) of the total cost of the air dryers used for heavy vehicle air brake systems. Purge valves also contribute significantly to the overall size of the air dryer. Thus, while the currently used purge valves are effective for their intended purpose, a need exists for a smaller, less-expensive purge valve that is compatible with existing air dryer systems and technology.

SUMMARY OF THE INVENTION

Deficiencies in and of the prior art are overcome by the present invention, an exemplary embodiment of which provides an air brake system that utilizes an air dryer that further includes a purge valve for expelling air stream contaminants captured by the air dryer. In accordance with one aspect of this invention, a vehicle air brake system is provided. This system includes at least one air brake, an air compressing means for providing compressed air to the air brake(s), an air drying means in communication with the air compressor for removing contaminants from the compressed air; and a purge valve for expelling the contaminants from the air drying means. In accordance with another aspect of this invention, a purge valve or purge valve assembly for use with an air dryer is provided. This purge valve assembly includes a housing or body, a piston disposed within the body, and a valve in communication with the piston. The valve includes a plurality of guide members attached to or formed integrally with the valve for providing positional stability to the valve within the body and for providing increased or enhanced airflow in, through, and around the valve. In some embodiments, the respective geometries of the piston body and the valve define a circumferential cavity between and around the piston body and the valve. A sealing member, e.g., an o-ring, is captured within the circumferential cavity for forming a seal between the valve and an interior portion of the body. A biasing member may be included for urging the piston upward within the body to close the valve. In one embodiment of this invention, various components of the purge valve assembly are manufactured from plastic or a similar flexible material and may be snapped together to form an assembly.

Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the exemplary embodiments given below, serve to explain the principles of the invention.

DETAILED DESCRIPTION OF THE INVENTION

This invention relates to an air brake system that utilizes an air dryer that includes a purge valve for expelling air stream contaminants captured by the air drying system. In accordance with one embodiment of this invention, an air brake system for a heavy vehicle such as a truck or bus is provided. This system includes at least one air brake, an air compressor for providing compressed air to the air brake(s), an air dryer in communication with the air compressor for removing contaminants from the compressed air; and a purge valve for expelling contaminants from the air dryer. In accordance with another aspect of this invention, a purge valve for use with an air dryer is provided. This purge valve includes a body, a piston disposed within the body, and a valve in communication with the piston. A plurality of guide members attached to or formed integrally with the valve provide positional stability to the valve within the body and provide increased or enhanced airflow through the valve. The respective geometries of the piston body and the valve may define a circumferential cavity between and around the piston body and the valve. A sealing member or means, e.g., a bonded rubber o-ring, is typically captured within the circumferential cavity for forming a seal between the valve and the interior of the body. A spring or other biasing member urges the piston upward within the body into the closed position and maintains the seal when the air drying system is in the charge mode.

Figure 1:
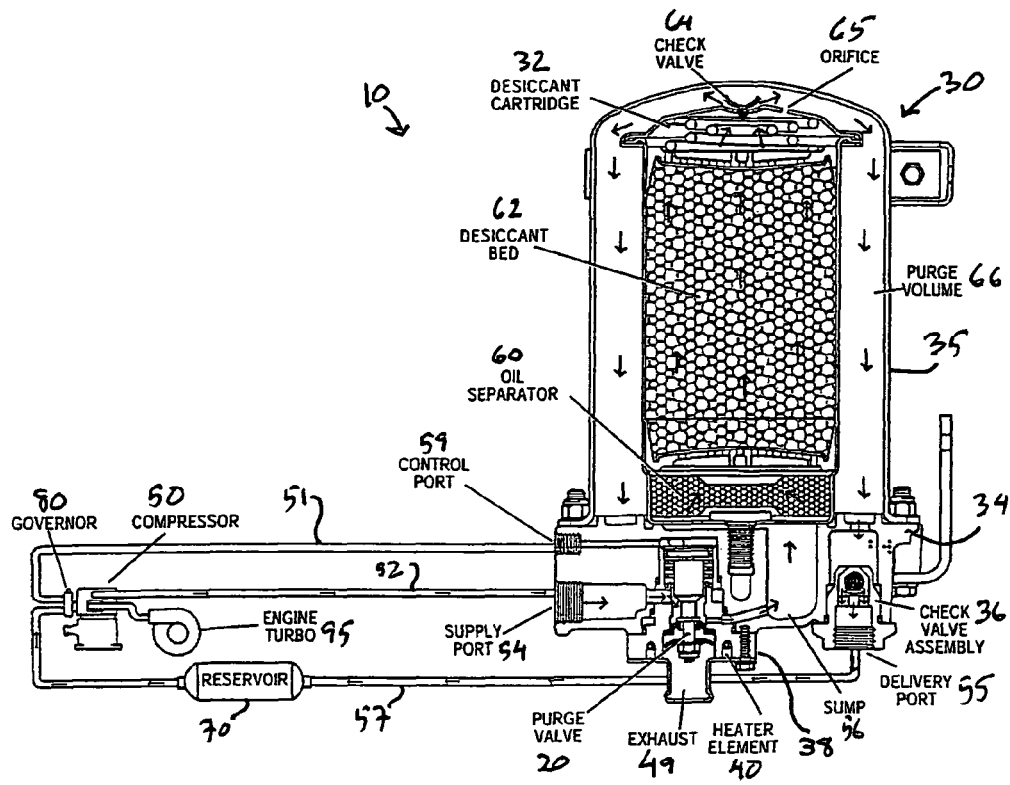
FIG. 1 is a schematic diagram of an exemplary air dryer system shown in the charge mode.
Figure 2:
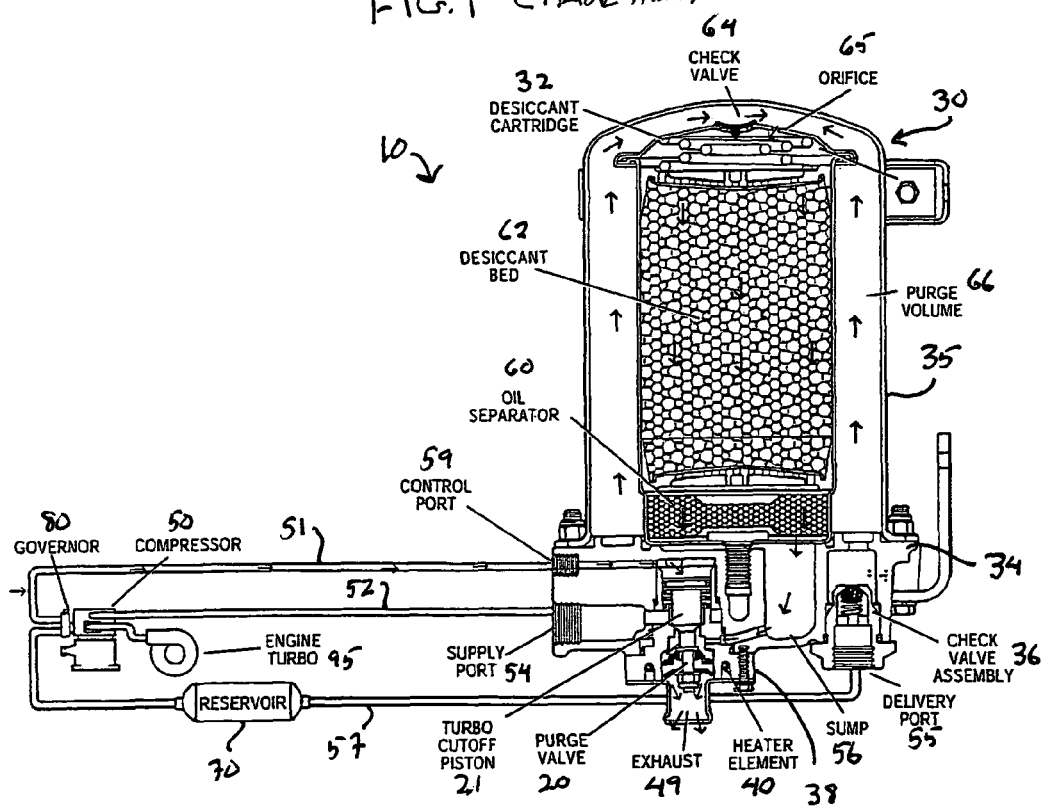
FIG. 2 is a schematic diagram of an exemplary air dryer system shown in the purge mode.

With reference now to the Figures, for the purpose of providing context for the present invention, FIGS. 1 and 2 illustrate the components and typical operation of an exemplary prior art air dryer system 10 that includes a purge valve 20. The prior art system shown in FIGS. 1 and 2 is the AD-9 Air Dryer system manufactured by Bendix Commercial Vehicle Systems (Elyria, Ohio). The air dryer 30 shown in the Figures removes air system contaminants in solid, liquid, and vapor form before they can enter the vehicle's brake system. Air dryer 30 includes a desiccant cartridge 32 and a die cast aluminum end cover 34 secured to a cylindrical steel outer shell 35. End cover 34 contains a check valve assembly 36, three external ports 54, 55, and 59, and purge valve housing assembly 38. Removable purge valve housing assembly 38 includes a purge valve 20 and a turbo charger cut-off feature (see below) that reduces loss of engine turbo boost during the purge cycle of air dryer system 10. Exemplary air dryer system 10 alternates between two operational modes or cycles during normal operation: the charge cycle and the purge cycle.

During the charge cycle (see FIG. 1), when compressor 50 is loaded (i.e., is compressing air), compressed air, along with oil, oil vapor, water, and water vapor flows through compressor discharge line 52 to supply port 54. As air travels through discharge line 52, it cools and causes airborne contaminants to condense and drop to the into sump 56. After exiting end cover 38, the air flows into desiccant cartridge 32 and enters oil separator 60, which removes water in liquid form as well as oil and solid contaminants. Air exits oil separator 60 and enters desiccant bed 62. Air flowing through the column of desiccant material becomes progressively drier as water vapor adsorbs to the desiccant material. Dried air exits desiccant cartridge 32 through integral check valve 64 and fills the purge volume 66 between cartridge 32 and outer shell 35. Dry air then flows out of purge volume 66 through the single check valve assembly 36, out delivery port 55, and discharge line 57 to the first (supply) reservoir 70 of the air brake system. Air dryer 30 will remain in the charge cycle until air brake system pressure builds to a predetermined governor cutout setting (e.g., 130 psi).

When the air brake system pressures reaches the cutout setting of governor 80, the compressor 50 unloads (i.e., air compression ceases) and the purge cycle of dryer system 10 begins (see FIG. 2). When governor 80 unloads compressor 50, line 51, which connects governor 80 to control port 59, is pressurized and provides control air. This control air acts on piston 21 of purge valve 20, opening the valve to atmosphere and partially closing off the supply air coming from compressor 50. Contaminants in sump 56 are expelled through exhaust port 49 when purge valve 20 opens. Air that was flowing through desiccant cartridge 32 changes direction and begins to flow toward the open purge valve 20. Oil and solid contaminants collected by oil separator 60 are removed by air flowing from desiccant bed 62 to the open purge valve 20. Reactivation of desiccant bed 62 begins as dry air flows from purge volume 66 though desiccant cartridge purge orifice 65 and into desiccant bed 62. Single check valve assembly 36 prevents air pressure in the brake system from returning to air dryer 10 during the purge cycle. Purge valve 20 will remain open after the purge cycle is complete and will not close until air brake system pressure is reduced and governor 80 signals compressor 50 to charge.

The exemplary air dryer system shown in FIGS. 1 and 2 also includes a "turbo cut-off valve" function that prevents loss of engine turbocharger air pressure through the air dryer 30 because the compressor intake is connected to engine turbocharger 95. At the onset of the purge cycle, the downward movement of piston 21 is stopped when the turbo cut-off valve contacts its mating metal seat in purge valve housing 38. When the turbo cut-off valve is seated (i.e., closed), air in control line 51 and air in supply line 52 is restricted from entering air dryer 30.

Figure 3:
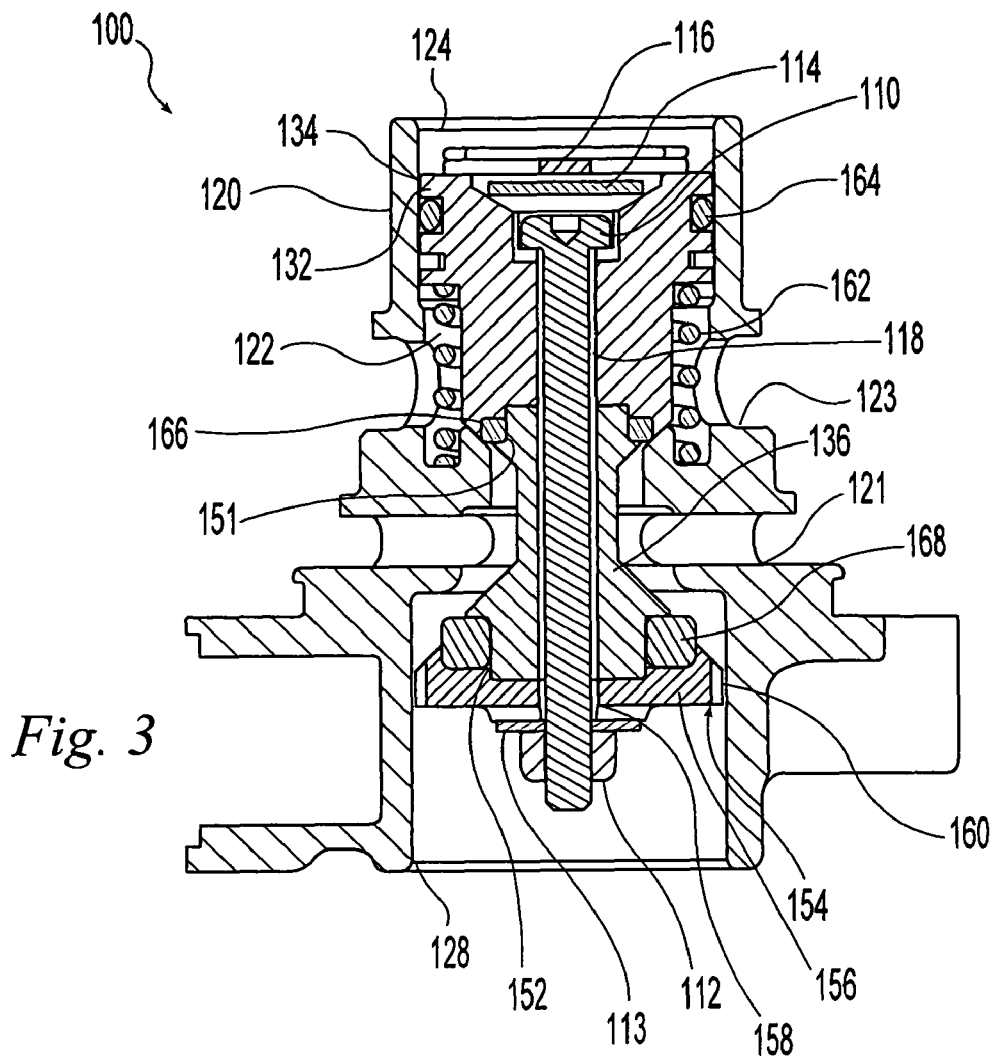
FIG. 3 is cross-sectional side view of a first embodiment of the purge valve of the present invention shown in the purge mode.

With reference now to FIG. 3, a first exemplary embodiment of the purge valve of the present invention is shown. This embodiment is compatible with the exemplary air dryer system previously described and is designed to replace the purge valve currently used with this and other air dryer systems. As shown in FIG. 3, purge valve 100, which is shown in purge mode, includes a body 120 that further includes an internal chamber 122, a control signal port 124 for receiving control air from the governor, at least one air outlet port 121 for delivering air to the desiccant bed, at least one air inlet port 123 for receiving supply air from the compressor, and an exhaust port 128 for exhausting air system contaminants from valve 100. Disposed within internal chamber 122 is piston 132 and valve 154. A biasing member or spring 162 biases piston 132 and valve 154 into the closed position within body 120 and maintains the seal between valve 154 and body 120 when the system is in charge mode.

Piston 132 further comprises piston head 134, which is attached to piston body 136. In this embodiment, piston head 134 includes a drain valve 114, which is attached to the piston head by retainer 116, for funneling fluid into the top portion of the piston head. Piston body 136 is attached to die-formed valve 154. A connecting member or bolt 110 runs through a centrally positioned bore in piston head 134 and piston body 136. Bolt 110 also passes through opening 158 in valve 154 and exits the bottom of valve 154 where it is secured by washer 113 and nut 112, which may be a lock nut. Bolt 110 connects piston head 134, piston body 136, and valve 154 to one another and allows these components to move as a unit. As shown in FIG. 3, the diameter of the centrally positioned bore is greater than the diameter of bolt 110. This difference in diameter creates an annular space between the two components, which provides a flow path 118 through the center of the piston and valve for allowing fluid to pass through the center of these components. Flow path 118 reduces or eliminates fluid that may bypass first sealing member 164, which encircles piston head 134 and forms a seal with chamber 122. In the exemplary embodiment, radial slots are formed in the bottom of the bolt counter bore and the bottom of the die-formed valve 154 to facilitate fluid drainage.

Again with reference to the exemplary embodiment shown in FIG. 3, the bottom portion of piston head 134 and the flanged top portion of piston body 136 define a first circumferential cavity 151. Second sealing member 166 is situated within cavity 151 and seats against body 120 during the purge mode, thereby functioning as the turbo-cut off valve previously described. Similarly, the flanged bottom portion of piston body 136 and the top portion of valve 154 form a second circumferential cavity 152. Third sealing member 168, which is typically a standard, relatively large diameter plastic or rubber o-ring, or a square cut seal (i.e., lathe cut ring), is situated within circumferential cavity 152 and forms a seal with body 120 when the system is in charge mode. Because the combined structural features of piston body 136 and valve 154 effectively contain sealing member 168, there is no need for the expensive rubber to metal bonding step that is used in prior art purge valves and turbo cut-off valves to attach a sealing means to a piston.

Figure 4:
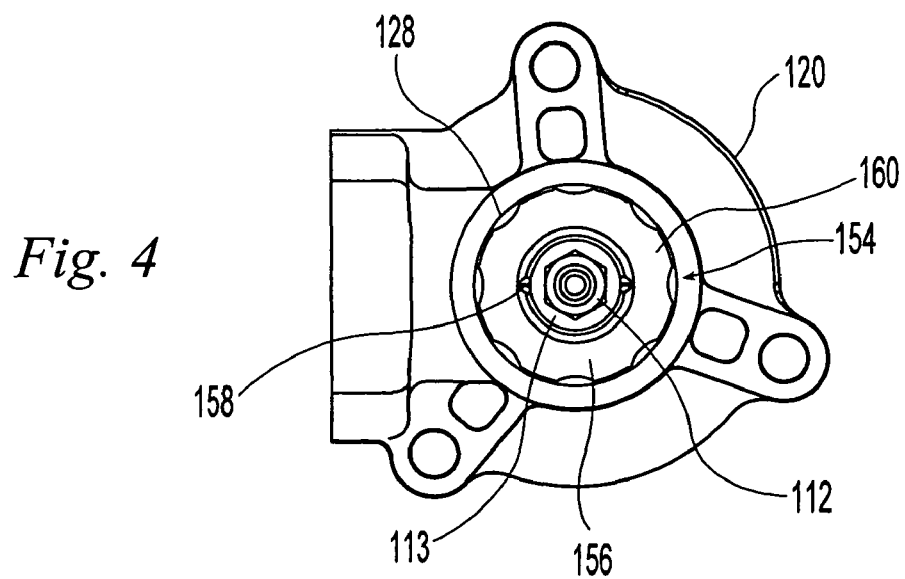
FIG. 4 is a bottom view of the first embodiment of the purge valve of the present invention.

As best shown in FIG. 4, a plurality of perimeter vanes or guide members 160 attached to or formed integrally with body 156 keep the valve properly positioned within the lower portion of body 120 and provide enhanced airflow in, through, and around the valve. In this embodiment, the peripheral surfaces of the guide members are in very close proximity to the internal surface of body 120 so that the piston does not move out of concentric alignment within exhaust port 128. Guide members 160 provide a more open air flow path for purge air released by the air dryer. In general, rapid purge air release is beneficial for air dryer regeneration.

As previously described, piston 132 moves within internal chamber 122 in response to pressurized air acting on piston head 134. When the air dryer system into which purge valve 100 is incorporated is in charge mode, biasing member 162 urges piston 132 upward into the closed position within internal chamber 122 and third sealing member 168 seats against a corresponding surface on the interior of body 120 and forms a seal which effectively closes valve 100. When pressurized air is delivered to piston head 134 through port 124 during the purge mode, piston 132 moves downward, breaking the seal between third sealing member 168 and the interior of body 120, and opening valve 100 to atmosphere so that sump 56 can be drained and collected contaminants can be expelled from the air drying system.

Figure 5:
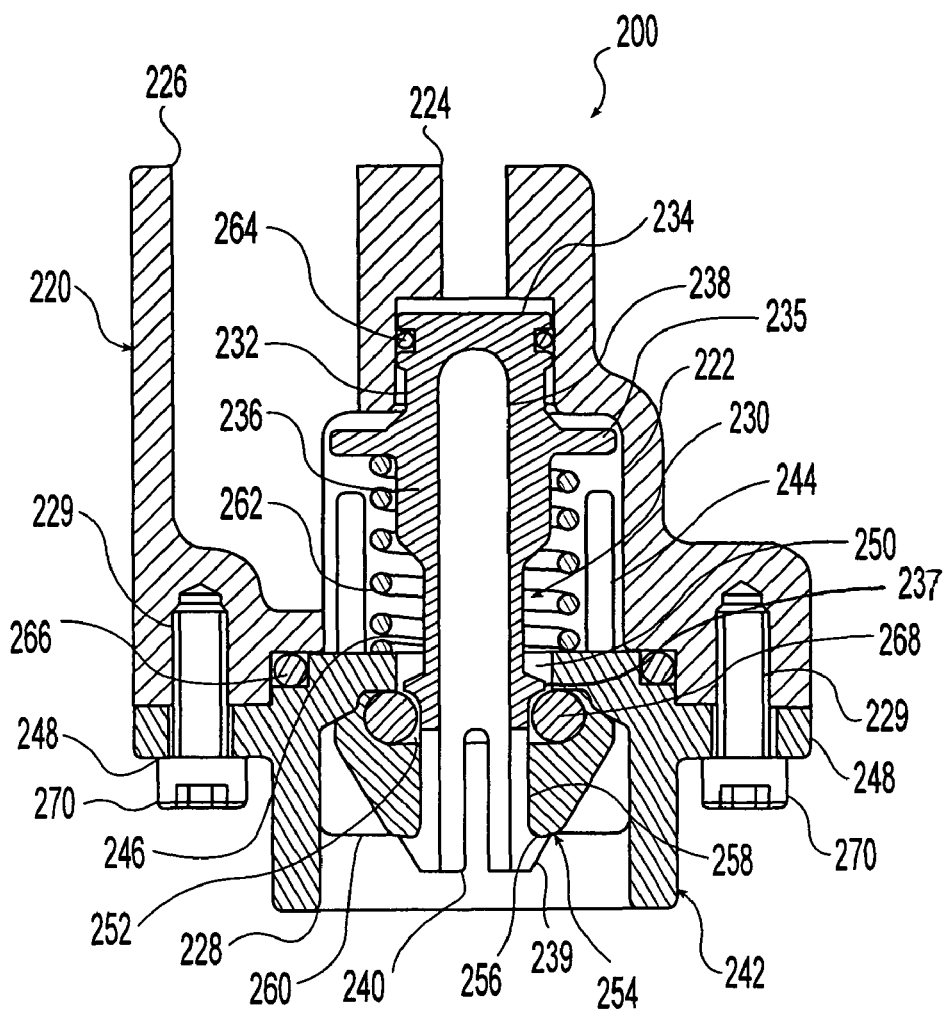
FIG. 5 is cross-sectional side view of a second embodiment of the purge valve of the present invention shown in the charge mode.
Figure 6:
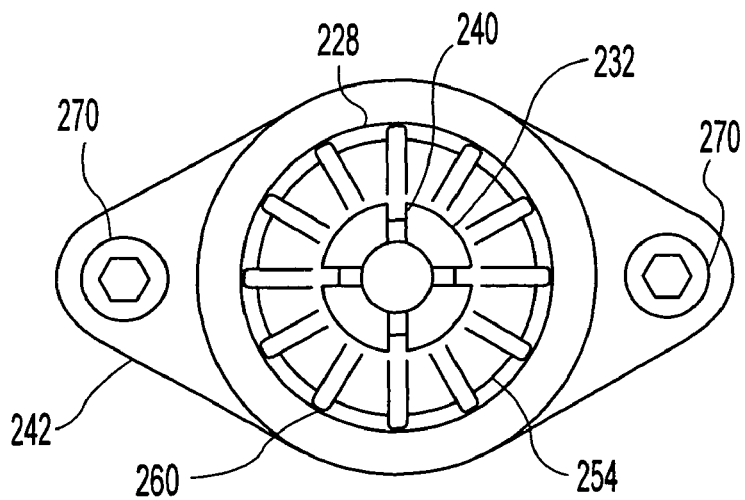
FIG. 6 is bottom view of the second embodiment of the purge valve of the present invention.
Figure 7:
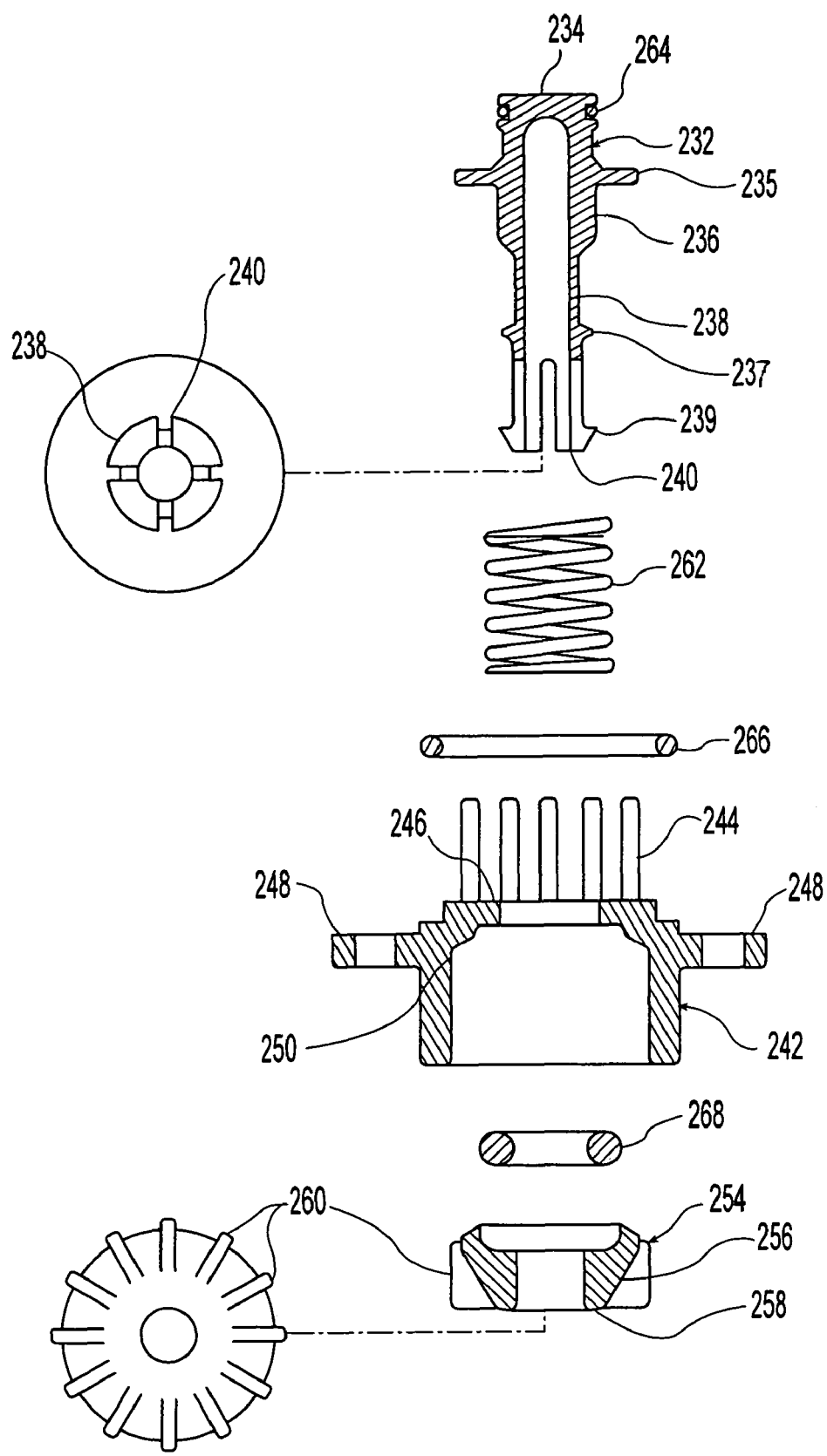
FIG. 7 is an exploded side view of the second embodiment of the purge valve of the present invention. Bottom views of the piston and valve are also provided.

With reference now to FIGS. 5-7, a second exemplary embodiment of the purge valve of the present invention is shown. This embodiment typically includes a number of snap-together plastic components. As best shown in FIGS. 5 and 7, purge valve 200, which is shown in the charge mode, includes a body 220 that further includes an internal chamber 222, a control signal port 224 for receiving control air from the governor 80, a drain sump 226 for collecting condensed contaminants, an exhaust port 228 for exhausting air system contaminants from valve 200, and a plurality of recesses 229 for receiving fasteners 270. Disposed within internal chamber 222 is valve cartridge 230, which includes piston 232 and valve 254. A biasing member or spring 262 biases piston 232 and valve 254 in an upward direction into the closed position within body 220, and maintains the seal between valve 254 and body 220 when the system is in charge mode.

Piston 232 includes piston head 234 and piston body 236, which in this embodiment includes a substantially hollow interior chamber 238. A first sealing member 264 encircles piston head 234 and forms a seal between the piston and chamber 222. The lower portion of piston body 236 includes a plurality of notches 240, which permit a certain degree of deformation of the lower portion so that the piston may be inserted through opening 258 in the body 256 of valve 254 and snapped securely into place. Once in place, a flange 239 encircling the bottom portion of piston body 236 prevents the piston from becoming inadvertently detached from valve 254. As best shown in FIGS. 5 and 7, the middle portion of piston body 236 includes an additional flange 237 that cooperates with a similar structure on the top portion of valve 254 to create circumferential cavity 252 which retains third sealing member 268. This sealing member is typically a standard, relatively large diameter o-ring or a square cut seal (i.e., lathe cut ring) and provides the means by which valve 254 seals against the interior of body 240 when the valve is in charge mode. As with the first exemplary embodiment of the purge valve of this invention, this configuration eliminates the need for the expensive rubber to metal bonding step that is used in prior art purge valves to attach a sealing means to the piston.

As shown in FIG. 6, a plurality of perimeter vanes or guide members 260 attached to or formed integrally with valve 254 keep the valve properly positioned within chamber 250 and provide enhanced airflow in, through, and around the valve. In this embodiment, the peripheral surfaces of the guide members are in very close proximity to the internal surface of chamber 250 so that the piston does not move out of concentric alignment within exhaust port 228. Guide members 260 provide a more open air flow path for purge air released by the air dryer.

As best shown in FIG. 7-8, this exemplary embodiment of purge valve 200 also includes a separate valve body 242 which attaches to body 220. A plurality of fastening apertures 248 receive fasteners 270 which are tightened into recesses 229 in body 220 to secure the parts to one another. Piston body 236 extends through opening 246 and when valve cartridge 230 is properly assembled, valve 254 resides within valve body chamber 250 (see FIGS. 4-5). Second sealing member 266 encircles valve body 242 and forms a seal with body 220 when valve body 242 is properly attached to body 220. In this embodiment, a plurality of piston stop pins 244 are formed integrally with valve body 242 and, in combination with ring structure 235 on piston body 236, provide a means for limiting the extent of the downward motion of piston 232 when the valve is in purge mode.

As with the first exemplary embodiment, piston 232 moves within internal chamber 222 in response to pressurized air acting on piston head 234. When the air dryer system into which purge valve 200 is incorporated is in charge mode, biasing member 262 urges piston 232 upward within chamber 222 and third sealing member 268 seats against a corresponding surface on the interior of body 220 and forms a seal which effectively closes valve 200. When pressurized air is delivered to piston head 234 through port 224 during the purge mode, piston 232 moves downward, breaking the seal between third sealing member 268 and the interior of body 220, and opening purge valve 200 to atmosphere so that collected contaminants can be expelled from the air dryer.

As previously stated, the exemplary embodiments (the second embodiment, in particular), of the purge valve of the present invention include components that may be manufactured from plastic or other flexible material and snapped together to form an assembly. Manufacturing piston 232, valve body 242, and valve 254 from plastic provides additional cost savings because the materials used are less expensive and assembly of the valve is simplified. Additionally, the general design of this embodiment may provide for a purge valve that is smaller in size that prior art purge valves, thereby reducing the overall size of the air dryer system and conserving space on or within the vehicle.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A purge valve for use with an air drying system, comprising:

(a) a body, wherein the body further comprises at least one internal chamber and at least one external port;

(b) a piston disposed within the body, wherein the piston further comprises:
   (i) a piston head, wherein the piston head further comprises a bore passing lengthwise therethrough; and
   (ii) a piston body attached to the piston head, wherein the piston body further comprises a bore passing lengthwise therethrough; and
(c) a valve attached to the piston body, wherein the valve further comprises:
   (i) a bore passing lengthwise therethrough; and
   (ii) a plurality of guide members attached to or formed integrally with the valve, wherein the guide members provide positional stability to the valve within the body and provide enhanced airflow through the valve; and
(d) a connecting member passing completely through the bores in the piston head, piston body, and valve for attaching the piston head, piston body, and valve to one another.

2. The valve of claim 1, wherein the piston and the valve define a circumferential cavity, and wherein a sealing member is disposed within the circumferential cavity for forming a seal between the valve and the body.

3. The valve of claim 2, wherein the sealing member is an o-ring or a square cut seal.

4. The valve of claim 1, wherein the piston further comprises an internal channel extending lengthwise through the piston, and wherein the internal channel provides a flow path for contaminants.

5. The valve of claim 1, further comprising a biasing member encircling the piston, wherein the biasing member biases the piston upward within the body.

6. The valve of claim 1, wherein at least one of the piston, valve, and body are manufactured from a flexible material, and wherein the piston and valve may be snapped together to form an assembly.

7. The valve of claim 1, wherein the diameter of the bore passing through the piston head, piston body, and valve is greater than the diameter of the connecting member, and wherein the bore and the connecting member define an annular space therebetween.

8. A purge valve for use with an air drying system, comprising:
(a) a body, wherein the body further comprises at least one internal chamber and at least one external port;
(b) a piston disposed within the body, wherein said piston further comprises:
   (i) a piston head;
   (ii) a piston body; and
(c) a valve in communication with the piston body, wherein the lower portion of the piston body passes through the valve, and wherein the middle portion of the piston body and the upper portion of the valve define a circumferential cavity;
(d) a sealing member disposed within the circumferential cavity for forming a seal between the valve and the body; and
(e) a plurality of guide members directly attached to or formed integrally with the valve and extending radially outward from an axis defined by a length of the valve, wherein the guide members provide positional stability to the valve within the body and provide enhanced airflow through the valve.

9. The valve of claim 8, further comprising a biasing member encircling the piston, wherein the biasing member biases the piston upward within the body.

10. The valve of claim 8, wherein the body further comprises a separate, detachable section for containing the valve, wherein the top portion of the second section further comprises a plurality of protrusions, and wherein the protrusions cooperate with the piston body to limit downward motion of the piston within the internal chamber.

11. The valve of claim 8, wherein the sealing member is an o-ring or a square cut seal.

12. The valve of claim 8, wherein the bottom portion of the piston body further comprises at least one notch for facilitating the insertion of the piston into the valve.

13. The valve of claim 8, wherein the bottom portion of the piston body further comprises a flange for retaining the piston within the valve.

14. A method for constructing a purge valve for use with an air drying system, comprising:
(a) manufacturing a body;
(b) manufacturing a piston cartridge for placement within the body, wherein the piston cartridge further comprises:
   (i) a piston;
   (ii) a valve in communication with the piston; and
   (iii) a plurality of guide members directly attached to or formed integrally with the valve and extending radially outward from an axis defined by a length of the valve, wherein the guide members provide positional stability to the valve within the body and provide enhanced airflow through the valve; and
(c) placing the piston cartridge in the body; and
(d) attaching the body to the air dryer.

15. The method of claim 14, further comprising the step of placing a biasing member around the piston within the body for urging the piston upward in the body.

16. The method of claim 14, wherein the piston and the valve define a circumferential cavity, and wherein a sealing member is disposed within the circumferential cavity for forming a seal between the valve and the body.

17. The method of claim 14, further comprising the step of forming a channel extending lengthwise through the piston.

18. The method of claim 14, wherein at least one of the piston, valve, and body are manufactured from a flexible material, and wherein the piston and valve may be snapped together to form an assembly.

* * * * *